UNITED STATES PATENT OFFICE.

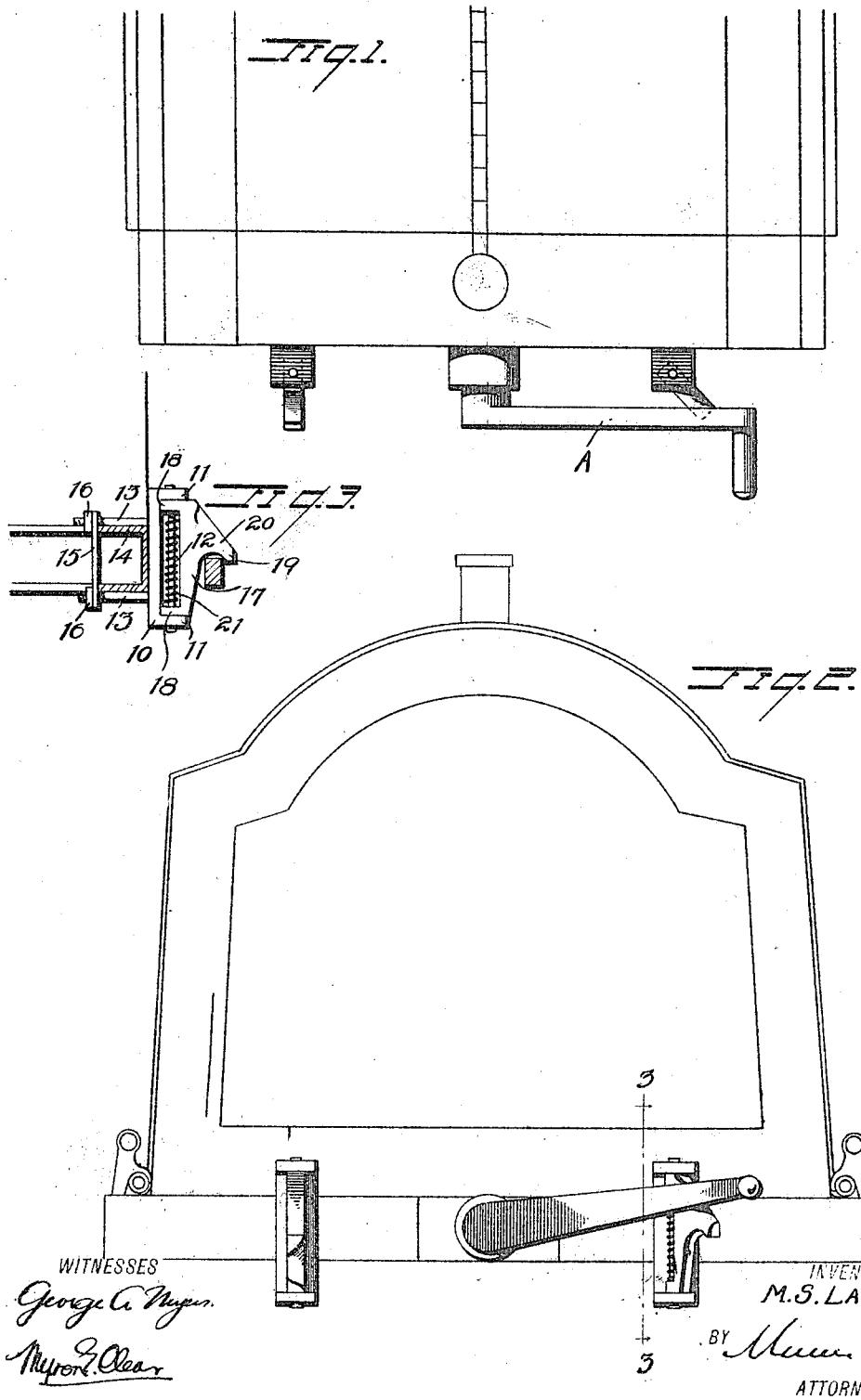

MOULTRIE S. LANIER, OF ROME, GEORGIA.

SAFETY CRANK-CATCH FOR AUTOMOBILES.

1,260,554.

Specification of Letters Patent.  Patented Mar. 26, 1918.

Application filed December 21, 1917.  Serial No. 208,274.

*To all whom it may concern:*

Be it known that I, MOULTRIE S. LANIER, a citizen of the United States, and a resident of Rome, in the county of Floyd and State of Georgia, have made certain new and useful Improvements in Safety Crank-Catches for Automobiles, of which the following is a specification.

My present invention relates generally to automobiles, and particularly to attachments for automobiles of that type employing hand cranks at the forward end of the power shaft, my object being the provision of a simple, inexpensive and positively acting catch which will engage the crank in case of back-fire, to prevent the usual fly back of the crank and obviate injury to the operator thereby.

A further object is to provide such a catch as may be readily duplicated and positioned at both sides of the starting crank and which may be readily mounted in connection with the forward portion of the vehicle frame.

In carrying out the above objects I provide a catch member having a laterally yielding movement with respect to its support, and against the tension of a spring which normally holds the catch in an outstanding operative position, the movement of the crank in turning the power shaft, shifting the catch laterally to permit of passage of the starting crank thereby, by virtue of engagement of the crank with a beveled portion of the catch adjacent its engaging shoulder. In this way but slight movement of the catch is required to permit the starting crank to pass, and the movement is such that the catch is immediately brought back to operative position through the tension of its controlling spring, so that it is almost instantly in position to prevent fly back of the starting crank.

In the accompanying drawing illustrating my invention and forming a part of this specification:

Figure 1 is a plan view of the forward portion of an automobile illustrating my improvements in connection therewith and at opposite sides of the starting crank, Fig. 2 is a front elevation thereof, and, Fig. 3 is a detailed vertical section taken substantially on line 3—3 of Fig. 2.

Referring now to these figures; my invention contemplates the provision of a catch including an upright bracket 10 having angular flanges 11 at its upper and lower ends, in which the upper and lower ends of a vertically disposed pivot pin 12 are fixed, said pivot pin extending between the upper and lower flanges 11 in parallel spaced relation to the bracket 10.

The bracket 10 is also provided with rearwardly projecting bolts 13, providing for its connection with a portion of the frame 14 of an automobile, which portion the bolts are adapted to span in the manner shown, particularly in Fig. 3, a coupling plate 15 being utilized at the free ends of the bolts, the latter of which are threaded to receive nuts 16.

The catch member 17 has upper and lower flanges 18 through which the pivot pin 12 extends, these flanges 18 being disposed adjacent to the inner faces of the flanges 11 of the bracket 10 for a purpose which will be presently brought out.

At one side the catch member 17 is cut away to form an engaging hook 19, and is provided with a beveled surface 20 presented in an opposite direction with respect to the hook 19, so that irrespective of whether the latter faces upwardly or downwardly the beveled face 20 is in advance of the hook with respect to the ordinary direction of rotation of the starting crank A.

Thus it is obvious that my invention is susceptible of mounting, as indicated in Figs 1 and 2, at relatively opposite sides of the starting crank A, the hook member at one side being presented downwardly and the hook member at the opposite side being presented upwardly. In this way should one of the hook members become accidentally broken or for any other reason fail to act, the other hook member will supplement the same and check the fly-back of the crank handle A.

It is obvious, furthermore, that due to the particular construction outlined, each of the hook members will in the usual clockwise rotation of the crank A, yield readily and easily against the tension of the controlling spring 21, which is disposed around the intermediate portion of the pivot pin 12, and in such manner as that the action of said spring will result in practically instantaneous restoration thereof to operative position, so as to avoid all danger by back-fire.

It is also obvious from the description detailed above, that when engaged by the starting crank in case of back-fire, the hook member transmits the shock of such engagement through its body, and through the flanges 18 thereof, and the flanges 11 of the bracket 10, to the latter, and hence to the front portion of the automobile frame, so as to obviate excessive strain and shearing of the pivot pin 12.

I claim:—

1. A safety catch for the starting crank of an automobile consisting of an upright bracket having horizontal flanges at its upper and lower ends, and provided with means to stationarily secure the same in upright position, a pivot pin having its opposite ends fixed in the said flanges, and extending between the flanges in spaced parallel relation to the bracket, and a catch member having upper and lower flanges adjacent the inner faces of the flanges of the bracket, and through which the pivot pin extends, said catch member having an outstanding hook and provided with a controlling spring to normally hold the catch member in outstanding operative position and in laterally yielding relation to the bracket.

2. A safety catch for the starting crank of an automobile comprising a bracket having means to secure the same rigidly in upright position upon the forward portion of an automobile, and a pivot pin supported by the bracket, a catch member extending in upright position and portions of which are engaged by the pivot pin to support the catch member in laterally yielding relation to the bracket, and a spring normally holding the catch member in its intermediate operative position, said catch member and said bracket having relatively engaging portions to absorb shocks from engagement by starting cranks and obviate strain upon the said pivot pin.

3. A safety catch for the starting cranks of automobiles comprising an upright bracket, an upright catch member, a vertically disposed pivot pin connecting the bracket and catch member, a spring normally supporting the catch member in operative position and in laterally yielding relation to the bracket, said catch member having an outstanding hook and provided with a beveled surface facing in a direction opposite to the said hook, for the purpose described.

MOULTRIE S. LANIER.

Witnesses:
J. A. CARR, Jr.,
WADE C. HOYT.